Dec. 9, 1958

T. C. HUXLEY III, ET AL 2,863,446

PRESSURE REGULATOR DEVICE FOR RESPIRATORS

Filed July 8, 1953

INVENTORS
Thomas C. Huxley III
Nelson G. Kling
BY
ATTORNEYS

United States Patent Office 2,863,446
Patented Dec. 9, 1958

2,863,446

PRESSURE REGULATOR DEVICE FOR RESPIRATORS

Thomas C. Huxley III, Manhasset, and Nelson G. Kling, Roslyn, N. Y., assignors to Conitech, Ltd., New York, N. Y., a corporation of New York Application July 8, 1953, Serial No. 383,562

16 Claims. (Cl. 128—29)

This invention relates generally to improvements in respiration apparatus and, more particularly, to improvements in pressure regulator devices therefor.

One object of the present invention is the provision of a pressure regulator device, adapted for use with a cyclically operable air pump adapted to alternately produce sub-atmospheric pressure and super-atmospheric pressure, which is effective to cyclically supply a relatively high degree of sub-atmospheric pressure for a brief interval to respiration apparatus.

Another object of the present invention is the provision of a pressure regulator device of the above character which is adapted to supply a patient positioned in a respiration chamber with a controlled amount of sub-atmospheric pressure for a brief interval.

Yet another object of the present invention is the provision of a generally improved pressure regulator device which is simple in design and construction, economical to manufacture, and highly efficient in the accomplishment of its intended purposes.

The above and other objects, features and advantages of the present invention will be more fully understood from the following description considered in connection with the accompanying drawings.

In the drawing which illustrates the best mode now contemplated by me for carrying out my invention:

Figure 1:
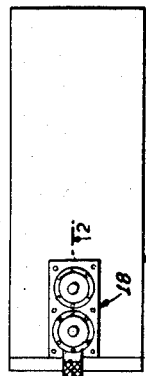
Fig. 1 is a side elevation view of a respiration chamber showing an air pump and a pressure regulator device formed according to the present invention operably associated therewith.

With reference to the drawing, and more particularly, to Fig. 1 thereof, there is shown a respiration compartment or chamber 10, commonly referred to as an "iron-lung," which is adapted for the reception of a patient in the conventional manner. Thus a patient to be subjected to the respiration treatment, to be hereinafter fully described, is positioned in the respirator chamber or compartment 10 and the latter will be sealed from the atmosphere. The interior of compartment 10 is adapted for fluid communication with the air pump 12 which is cyclically operable to alternately produce sub-atmospheric pressure and super-atmospheric pressure, said air pump being of any conventional construction. Thus the air pump 12 is provided with a port 14 which is adapted for fluid communication with the interior of compartment 10 for cyclically applying sub-atmospheric pressure thereto in a manner to be described in detail hereinafter. The port 14 of the air pump 12 is in fluid communication with the conduit 16 and the latter is in fluid communication with the pressure regulating device 18, it being noted that said device is interposed between the compartment 10 and the conduit 16. In the illustrated embodiment the pressure regulator device 18 is secured directly to a wall portion of the compartment 10 although it will be readily apparent that if desired said regulator device may be spaced from said compartment and suitably connected therewith in any conventional manner.

Figure 3:
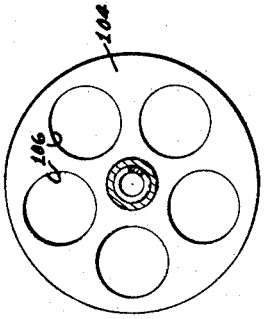
Fig. 3 is a sectional view taken on the line 3—3 of Fig. 2.
Figure 2:
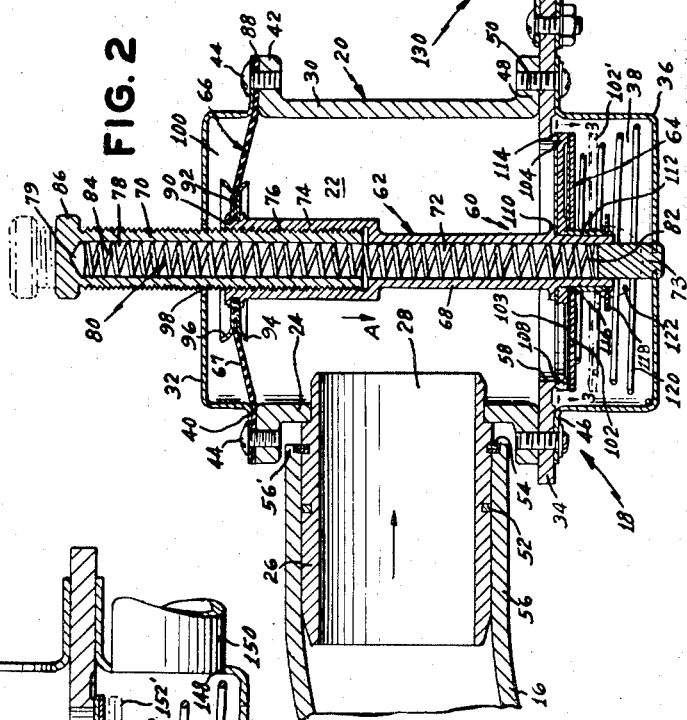
Fig. 2 is a sectional view, on an enlarged scale, taken on the line 2—2 of Fig. 1.
Figure 4:
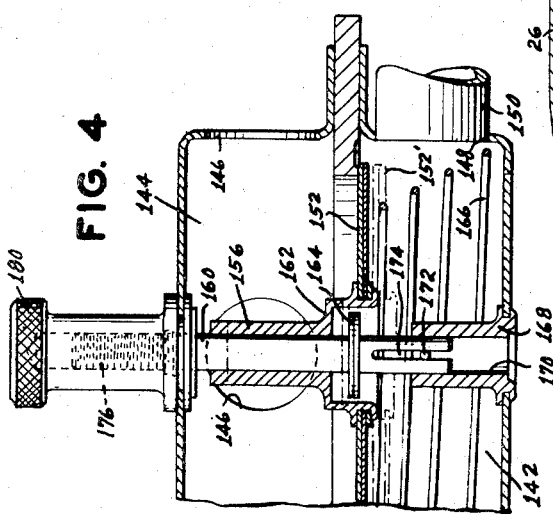
Fig. 4 is a sectional view, on an enlarged scale, taken on the line 4—4 of Fig. 2.

With reference to Figs. 2–4, the regulator device 18 comprises a casing 20 having a main fluid chamber 22. Secured to the wall portion 24 of casing 20 is a fitting 26 defining a passage 28 which communicates with the chamber 22. The casing 20 comprises a body part 30 having a casing part 32 secured thereto at one side thereof and a plate 34 secured thereto at an opposite side thereof, said plate having a casing part 36 secured thereto so as to define the chamber 38 which is separated from the chamber 22 by valve means to be described hereinafter. The casing part 32 is provided with a peripherally extending flange 40 which is secured to the flange 42 of the body part 30 by means of the screws 44. Similarly the casing part 36 is provided with a peripherally extending flange 46 which is secured to the plate 34 and the flange 48 of the body part 30 by means of the screws 50, said plate being disposed between said flanges as clearly shown in Fig. 2.

Accordingly, the screws 50 are adapted to secure the casing part 36, plate 34, and body part 30 into a unitary assembly. It will be understood that the fitting 26 which is secured to the portion 24 of the body part 30 is in the fluid sealing relation with the latter and said fitting is provided with a sealing ring 52 and an abutment element 54 in spaced relation. The terminal end portion 56 of the conduit 16 is adapted to be releasably secured to the fitting 26 in fluid sealing relation therewith. More particularly, the end portion 56 of the conduit 16 is adapted to be frictionally interengaged with the fitting 26 and telescoped thereover until the abutment element 54 is in abutting relation with the end 56' of said conduit. The plate 34 is provided with an opening or port 58 which extends therethrough, said port communicating with the chamber 22. The port 58 of the chamber 22 is provided with valve means 60 which controls the opening and closing of said port and accordingly the fluid communication between chambers 22 and 38.

The valve means 60 for controlling the fluid communication between chambers 22 and 38 comprises an axially movable member 62 which carries a valve member 64 and a diaphragm 66 in laterally spaced relation, it being noted that said valve member is operatively associated with the port 58 and that the diaphragm 66 defines part of chamber 22. The axially movable member 62 comprises a pair of threadedly interengaged parts 68 and 70, said part 68 having an aperture 72, an end portion of which has the part 73 positioned therein for guiding the axial movement of member 62. The part 73 is in fixed relation with the casing part 36 and projects into the chamber 38, said part 73 being adapted for slidable reception in aperture 72 for guiding the axial movement of the part 68. The part 68 is provided with an enlarged end portion 74 having an internally threaded aperture 76, the latter being formed complementary to the externally threaded part 70 which is adapted to be threadedly interengaged with portion 74 of part 68. The externally threaded part 70 is provided with an aperture 78 which is dimensioned complementary to the aperture 72 and is in alignment therewith. The apertures 72 and 78 have a longitudinally extending compression spring 80 positioned therein for a purpose which will be evident from the description that follows. The end 82 of spring 80 coacts with the part 73 and the opposite end 84 of said spring coacts with the bottom 79 of the aperture 78, the tension of said spring being adjustable by the rotation of part 70, the part 68 being fixed against rotation. The part 70 terminates externally of the casing 20 in a knurled knob 86 which is adapted to facilitate the manual rotation of the part 70 for adjusting the axial position thereof relative to the part 68 for adjusting the tension of the spring 80. The diaphragm 66 may be formed of any suitable flexible material, for example rubberized cloth, and the peripherally extending marginal portion 88 of said diaphragm is secured between the flange 40 of casing part 32 and the flange 42 of the body part 30. Thus the portion 88 of the diaphragm 66 is clamped between the body part 30 and the casing part 32 by means of the screws 44 aforedescribed. The portion 74 of part 68 is provided with a peripherally extending recess 90 and the peripherally extending portion 92 of the diaphragm 66 is clamped in said recess through the intermediation of the oppositely arranged companion dish shaped elements 94 and 96. Thus the peripherally extending portion 92 of the diaphragm 66 is clamped between elements 94 and 96 and the latter elements and said portion of the diaphragm are secured in the peripherally extending recess 90 of part 68. Thus the portion 92 of the diaphragm 66 is in fixed relation with the member 62 and is in fluid sealing relation therewith. The casing part 32 is provided with a suitable aperture 98 for the reception therethrough of the part 70, there being sufficient clearance between said parts so as to permit the entrance of air in the chamber 100 whereby the adjacent face 67 of the diaphragm 66 will be subjected to atmospheric pressure. Thus one side of the diaphragm 66 will be subjected to the pressure in chamber 22 and the opposite side of said diaphragm will be subjected to atmospheric pressure which enters between the casing part 32 and the part 70 at aperture 98.

The valve member 64 comprises a pair of companion valve discs 102 and 104 which are integrated with the part 68 in a manner now to be described. The valve disc 104 is provided with a plurality of peripherally spaced openings 106 which are adapted for a purpose to be subsequently described and said disc is provided with a peripherally extending rib or flange 108 which is adapted to coact with the valve disc 102. The part 68 is provided with an abutment part 110 against which valve disc 104 is positioned, said valve disc being retained in fixed position on part 68 by means of the collar 112. Thus the valve disc 104 is in fixed relation with the part 68 and is movable therewith in a manner to be described in detail hereinafter. The peripherally extending marginal portion 114 of plate 34 constitutes a valve seat for the valve disc 104, the axial movement of the part 68 in the direction of arrow A being adapted to unseat said valve disc so as to provide fluid communication between the chambers 22 and 38. The valve disc 102 is centrally apertured therethrough as indicated at 116, said aperture being formed complementary to the collar 112. The valve disc 102 is axially movable on the collar 112 between an inner position in which said valve disc is in abutting relation with the valve disc 104 to an outer position in which the valve disc 102 is in abutting relation with the stop member 118 which is fixed to part 68. The valve disc 102 is biased into abutting relation with its companion valve disc 104 by means of the light spiral spring 120, it being noted that the biasing force of said spring is substantially weaker than the biasing force of the spring 80 aforedescribed. The casing part 36 is provided with an opening 122 which is in fluid communication with the interior of compartment 10 whereby when the valve disc 104 is unseated from port 58 the interior of said compartment will be in fluid communication with the port 14 of the air pump 12. It will be noted that the movement of the member 62 in the direction of the arrow A provides for the movement of the valve discs 102 and 104 in unison, and the valve disc 102 is independently movable relative to the valve disc 104 on the collar 112. Accordingly, the movement of the member 62 in the direction of arrow A will be effective to concomitantly move the valve discs 102 and 104, which constitute the valve member 64, in said direction whereby to provide fluid communication between chambers 22 and 38. It will be noted that the port 58 is of a substantially smaller area than the area of the flexible diaphragm 66 which constitutes part of chamber 22 whereby when sub-atmospheric pressure is applied to the chamber 22 the member 62 will be axially moved in the direction of arrow A. Thus since the port 58 and the diaphragm 66 are of different areas an unbalanced pressure condition will take place in chamber 22 and when the sub-atmospheric pressure in said chamber reaches a predetermined amount the member 62 will be moved in the direction of arrow A to thereby move the discs 102 and 104 in unison in the direction of said arrow to open the port 58 whereby to provide fluid communication between the chamber 22 and the interior of compartment 10. Accordingly, when sub-atmospheric pressure is applied to the chamber 22 by the pump 12 the companion discs 102 and 104 will act in unison and will concomitantly axially move with the movement of the member 62. It also follows from the above that when the chamber 22 is subjected to super-atmospheric pressure by means of the air pump 12 the member 62 will be axially moved in a direction opposite to arrow A with the disc 104 being in closing relation with its companion port 58. However, the super-atmospheric pressure in chamber 22 will be effective to displace the valve disc 102 towards the stop member 118 whereby the disks 102 and 104 will be in spaced relation to provide a passage between said disks which will be in communication with the chamber 22 through the openings 106 in disk 104. Accordingly when super-atmospheric pressure is applied to chamber 22 the disc 104 will be in abutting relation with the valve seat 114 and the pressure will discharge into chamber 38 through the openings 106 which will be in fluid communication with said chamber 38 due to the independent movement of the valve disk 102 in the direction of the arrow A. Accordingly, under sub-atmospheric pressure conditions in chamber 22 the valve disks 102 and 104 will act in unison and under super-atmospheric conditions in said chamber said valve disks will be spaced apart so as to provide fluid communication between the chambers 22 and 38 through the openings 106.

In practice, the air pump 12 will be cyclically operable to alternately produce sub-atmospheric pressure and super-atmospheric pressure in the chamber 22 and said cyclical operation will be effective to provide a sudden surge of sub-atmospheric pressure in the compartment 10 for a very brief interval. By way of example the apparatus may be adjusted to provide approximately 50 cycles of pressure alternations per minute. Accordingly it will be apparent that the instant apparatus provides for a very high degree of sub-atmospheric pressure in the chamber compartment 10 for a very brief period. Thus the member 62 will be axially moved in opposite directions with a relatively high degree of frequency which will correspond to the pressure alternations in chamber 22 effected by means of the air pump 12 which is in fluid communication with said chamber at all times. The degree of sub-atmospheric pressure for the movement of the member 62 in the direction of the arrow A may be readily adjusted by axially adjusting the position of the part 70 which in turn controls the biasing force of the spring 80.

It is to be noted that the valve disk 102 is provided with a facing 103 which is adapted to coact with the peripherally extending flange 108 of the valve disk 104 for closing the openings 106 of the valve disk 104 to the chamber 38 when the valve disks 102 and 104 are in abutting relation. Thus the valve disk 102 is movable independently of the valve disk 104 on the collar 118 and by way of example the valve disk 102 is movable to the position 102' shown in Fig. 2.

With reference to Figs. 2 and 4, there is shown valve means 130 which is adapted to limit the sub-atmospheric pressure applied to the interior of the compartment 10. The valve 130 comprises complementary casing parts 132 and 134 which are secured to the plate 34 by means of the screws and nuts 136 and 138, respectively. The plate 34 is provided with an opening 140 which extends therethrough, said opening defining a port between the chambers 142 and 144. The chamber 144 is provided with a series of openings 146 which are in communication with the atmosphere whereas the chamber 142 is provided with an opening 148 which is in communication with the interior of compartment 10 by means of the conduit 150. In order to control the fluid communication between the chambers 142 and 144 there is provided a valve member 152 which is normally seated on the peripherally extending portion 154 of plate 34 and is axially movable therefrom under certain pressure conditions as will be subsequently described in detail. The valve member 152 is fixed to the axially movable part 156 in any suitable manner and said part is apertured therethrough as indicated at 158 for sliding reception on the shaft 160. The part 162 of the axially movable part 156 is adapted to coact with the stop collar 164 which is fixed to the shaft 160 in order to limit the opening axial movement of the valve member 152. Accordingly the valve member 152 is movable from the seat 154 under certain pressure conditions and is limited in such movement by the interengagement of the part 162 with the stop collar 164. It is to be noted that the valve member 152 is biased in a closing direction by means of the spiral spring 166 which is positioned in chamber 142. In order to adjust the amount of opening movement of valve member 152 the stop collar 164 is axially adjustable by the means to be now described. Extending into the chamber 142 is a guide part 168 which is apertured therethrough as indicated at 170 for the reception of the shaft 160. The guide part 168 is provided with a pin member 172 which extends transversely thereof and is adapted to ride in the slot 174 of the shaft 160. Thus the cooperation of the pin member and slots 172 and 174, respectively, will restrain the shaft 160 against rotation but will permit the axial movement thereof. The shaft 160 is provided with a threaded shaft portion 176 which is adapted to be received in the threaded aperture 178 of the adjusting screw 180. The adjusting screw 180 is mounted on the casing part 134 in any suitable manner and is fixed against axial movement but is free for rotational movement. It will be readily apparent from the above that the rotation of the adjusting screw 180 will be effective to axially move the shaft 160, said shaft being restrained against rotation in the aforedescribed manner whereby to provide for the axial movement of the stop collar 164 which is adapted to limit the opening movement of the valve member 152. Thus the adjusting screw 180 is effective to control the axial position of the stop collar 164 which in turn limits the opening movement of the valve member 152. It will be apparent that the position of the stop collar 164, which limits the maximum opening movement of the valve member 152, will also control the amount of fluid passing between the chambers 142 and 144. As aforenoted, the chamber 142 is subjected to compartment 10 pressure whereas the chamber 144 is subjected to atmospheric pressure. Accordingly when the sub-atmospheric pressure in the compartment 10 reaches a predetermined amount the valve member 152 will be displaced from its seat 154 to thereby permit atmospheric pressure to pass from chamber 144 to chamber 142 and to the interior of the compartment 10. Accordingly the valve 130 will limit the amount of sub-atmospheric pressure applied to the compartment 10 in that when said sub-atmospheric pressure reaches a predetermined amount the valve member 152 will open to thereby permit fluid communication between the chambers 142 and 144. As aforenoted the adjustable stop collar 164 is adapted to coact with the valve member 152 to limit the amount of opening of the latter whereby to control the amount of fluid passing between the chambers 142 and 144. As shown in Fig. 4, the valve member 152 is axially movable from its seat 154, for example to the position 152' whereby to provide for the aforedescribed fluid communication between the chambers 142 and 144. Although the valve 130 has been illustrated and described as in unitary relation with the pressure regulator device 18 it will be readily apparent that, if desired, the valve 130 may be formed as a separate unit and suitably integrated with the respiration compartment 10.

From the above it will be apparent that the pressure regulator device 18 is adapted for use with the cyclically operable air pump 12 which is adapted to alternately produce sub-atmospheric pressure and super-atmospheric pressure, and said device is effective to cyclically supply a relatively high degree of sub-atmospheric pressure for a brief interval to the respiration apparatus 10. As aforenoted, the member 62 of device 18 will axially move in opposite directions at a relatively high frequency which will be a function of the alternations between sub-atmospheric pressure and super-atmospheric pressure of the air pump 12.

While we have shown and described the preferred embodiment of our invention, it will be understood that various changes may be made in the present invention without departing from the underlying idea or principles of the invention within the scope of the appended claims.

Having thus described our invention, what we claim and desire to secure by Letters Patent, is:

1. A vacuum regulator device comprising a casing having a vacuum chamber, an inlet port for said chamber, an outlet port for said chamber in fluid communication with said inlet port, and valve means for controlling the opening and closing of said outlet port, said valve means comprising an axially movable member disposed in said chamber and supporting a valve member and a diaphragm in laterally spaced relation, said valve member being operatively associated with said outlet port and said diaphragm defining a wall portion of said chamber, said outlet port and said diaphragm being of different areas whereby when the vacuum in said chamber reaches a predetermined amount said movable member will be moved in one direction to concomitantly move said valve member in said direction and thereby open said port, said valve member comprising a pair of companion valve discs, one of said discs having an opening, said discs being movable in unison when said movable member moves in said one direction to open said outlet port and the other of said discs being movable independently of said one disc in said one direction whereby to provide a passage between said discs in communication with said chamber through said opening.

2. A vacuum regulator device comprising a casing having a vacuum chamber, an inlet port for said chamber, an outlet port for said chamber in fluid communication with said inlet port, and valve means for controlling the opening and closing of said outlet port, said valve means comprising an axially movable longitudinally extending member extending through said chamber and supporting a valve member and a diaphragm in spaced relation at opposite walls of said chamber, said valve member being operatively associated with said outlet port and said diaphragm defining part of said chamber, said outlet port and said diaphragm being of different areas whereby when the vacuum in said chamber reaches a predetermined amount said movable member will be moved in one direction to concomitantly move said valve member in said direction and thereby open said port, said valve member comprising a pair of companion valve discs, one of said discs having an opening, the latter being closed by the other of said discs on the movement of said movable member in said one direction, and means providing for the movement of said discs in unison in said one direction and for the independent movement of said other disc in said one direction whereby to provide a passage between said discs in communication with said chamber through said opening.

3. A vacuum regulator device comprising a casing having a vacuum chamber, an inlet port for said chamber, an outlet port for said chamber in fluid communication with said inlet port, and valve means for controlling the opening and closing of said outlet port, said valve means comprising an axially movable longitudinally extending member extending through said chamber and supporting a valve member and a diaphragm in spaced relation at opposite walls of said chamber, said valve member being operatively associated with said outlet port and said diaphragm defining part of said chamber, said outlet port and said diaphragm being of different areas whereby when the vacuum in said chamber reaches a predetermined amount said movable member will be moved in one direction to concomitantly move said valve member in said direction and thereby open said port, said valve member comprising a pair of companion valve discs, one of said discs having an opening, the latter being closed by the other of said discs in the movement of said movable member in said one direction, and means providing for the movement of said discs in unison in said one direction and for the independent movement of said other disc in said one direction whereby to provide a passage between said discs in communication with said chamber through said opening, spring means operatively connected to said movable member for biasing the latter in a direction opposite said one direction, and means for adjusting said spring means whereby to provide for the adjustment of the opening pressure of said valve member.

4. A vacuum regulator device comprising a casing having a vacuum chamber, an inlet port for said chamber, an outlet port for said chamber in fluid communication with said inlet port, and valve means for controlling the opening and closing of said outlet port, said valve means comprising an axially movable longitudinally extending member extending through said chamber and supporting a valve member and a diaphragm in spaced relation at opposite walls of said chamber, said valve member being operatively associated with said outlet port and said diaphragm defining part of said chamber, said outlet port and said diaphragm being of different areas whereby when the vacuum in said chamber reaches a predetermined amount said movable member will be moved in one direction to concomitantly move said valve member in said direction and thereby open said port, said valve member comprising a pair of companion valve discs, one of said discs having an opening, the latter being closed by the other of said discs in the movement of said movable member in said one direction, and means providing for the movement of said discs in unison in said one direction and for the independent movement of said other disc in said one direction whereby to provide a passage between said discs in communication with said chamber through said opening, resilient means associated with said movable member for biasing the latter in a direction opposite said one direction, and means for adjusting said resilient means whereby to provide for the adjustment of the opening pressure of said valve member, and means for biasing said other disc in a direction opposite said one direction towards interengaging relation with said one disc.

5. A regulator device, comprising a casing having a fluid chamber, inlet and outlet ports for said chamber in fluid communication with each other, and valve means for said outlet port, said valve means comprising an axially movable member carrying a valve member and a diaphragm in spaced relation at opposite walls of said chamber, said valve member being operatively associated with said outlet port and said diaphragm defining a wall portion of said chamber, said valve member comprising a pair of companion valve discs, one of said discs having an opening, means providing for the movement of said discs in unison in one direction and for the independent movement of the other disc in said one direction, first means for biasing said movable member and second means for biasing said other disc in a direction opposite said one direction, said biasing means for said other disc being substantially weaker than the biasing means for said movable member, said outlet port and said diaphragm being of different areas whereby when the sub-atmospheric pressure in said chamber reaches a predetermined amount said movable member will be moved in said one direction to thereby move said discs in unison in said direction to open said outlet port, the subjection of said chamber to super-atmospheric pressure being effective to position said one disc in closing relation with said outlet port and to position said other disc in spaced relation with said one disc whereby to provide a passage between said discs in communication with said chamber through said opening.

6. A regulator device, comprising a casing having a fluid chamber, inlet and outlet ports for said chamber in fluid communication with each other, and valve means for said outlet port, said valve means comprising an axially movable member carrying a valve member and a diaphragm in spaced relation at opposite walls of said chamber, said valve member being operatively associated with said outlet port and said diaphragm defining a wall portion of said chamber, said valve member comprising a pair of companion valve discs, one of said discs having an opening, means providing for the movement of said discs in unison in one direction and for the independent movement of the other disc in said one direction, first means for biasing said movable member and second means for biasing said other disc in a direction opposite said one direction, said biasing means for said other disc being substantially weaker than the biasing means for said movable member, said outlet port and said diaphragm being of different areas whereby when the sub-atmospheric pressure in said chamber reaches a predetermined amount said movable member will be moved in said one direction to thereby move said discs in unison in said direction to open said outlet port, the subjection of said chamber to super-atmospheric pressure being effective to position said one disc in closing relation with said outlet port and to position said other disc in spaced relation with said one disc whereby to provide a passage between said discs in communication with said chamber through said opening, said diaphragm being constituted by a thin flexible member having one face subjected to chamber pressure and having an opposite face subjected to atmospheric pressure.

7. In combination with a respirator device and an air pump cyclically operable to alternately produce sub-atmospheric pressure and super-atmospheric pressure in said device, a regulator device comprising a casing having a fluid chamber, an inlet port for said chamber in fluid communication with said pump, an outlet port for said chamber in fluid communication with said respirator device and with said inlet port, and valve means for controlling the opening and closing of said outlet port, said valve means comprising a valve member operatively associated with said outlet port and pressure responsive means defining part of said chamber operatively associated with said valve member, said valve means being adapted to move in one direction when said pump is operative to produce sub-atmospheric whereby to open said outlet port.

8. In combination with a respirator device and an air pump cyclically operable to alternately produce sub-atmospheric pressure and super-atmospheric pressure in said device, a regulator device comprising a casing having a fluid chamber, an inlet port for said chamber in fluid communication with said pump, an outlet port for said chamber in fluid communication with said respirator device and with said inlet port, and valve means for controlling the opening and closing of said outlet port, said valve means comprising a valve member operatively associated with said outlet port and pressure responsive means defining part of said chamber operatively associated with said valve member, said valve means being adapted to move in one direction when said pump is operative to produce subatmospheric whereby to open said outlet port, said pressure responsive means comprising a flexible diaphragm, the latter being disposed in fixed relation with said valve member, and said outlet port and said presure responsive means being of different areas.

9. In combination with a respirator device and an air pump cyclically operable to alternately produce sub-atmospheric pressure and super-atmospheric pressure in said device, a regulator device comprising a casing having a fluid chamber, an inlet port for said chamber in fluid communication with said pump, an outlet port for said chamber in fluid communication with said respirator device and with said inlet port, and valve means for controlling the opening and closing of said outlet port, said valve means comprising an axially movable member supporting a valve member and a diaphragm in spaced relation, said valve member being operatively associated with said outlet port and said diaphragm defining part of said chamber, said outlet port and said diaphragm being of different areas whereby when the sub-atmospheric pressure in said chamber reaches a predetermined amount said movable member will be moved in one direction to concomitantly move said valve member in said direction and thereby open said outlet port.

10. In combination with an air pump cyclically operable to alternately produce sub-atmospheric pressure and super-atmospheric pressure at a port, a regulator device comprising a casing having a fluid chamber, an inlet port for said chamber in fluid communication with said pump port, an outlet port for said chamber in fluid communication with said inlet and pump ports, and valve means for controlling the opening and closing of said outlet port, said valve means comprising an axially movable member carrying a valve member and a diaphragm in spaced relation, said valve member being operatively associated with said outlet port and said diaphragm defining part of said chamber, said valve member comprising a pair of companion valve discs, one of said discs having an opening, means providing for the movement of said discs in unison in one direction and for the independent movement of the other disc in said one direction, first means for biasing said movable member and second means for biasing said other disc in a direction opposite said one direction, said biasing means for said other disc beng substantially weaker than the biasing means for said movable member, said outlet port and said diaphragm being of different areas whereby when the sub-atmospheric pressure in said chamber produced by said pump reaches a predetermined amount said movable member will be moved in said one direction to thereby move said discs in unison in said direction to open said outlet port, the subjection of said chamber to super-atmospheric pressure by said pump being effective to position said one disc in closing relation with said outlet port and to position said other disc in spaced relation with said one disc whereby to provide a passage between said discs in communication with said chamber through said opening.

11. In combination with an air pump cyclically operable to alternately produce sub-atmospheric pressure and super-atmospheric pressure at a port of said pump, and a respirator compartment adapted for fluid communication with said port for cyclically applying sub-atmospheric pressure to said respirator compartment, a regulator device comprising a casing having a fluid chamber, an inlet port for said chamber in fluid communication with said pump port, an outlet port, for said chamber in fluid communication with said inlet and pump ports and adapted for periodic fluid communication with said compartment, and valve means for controlling the opening and closing and said outlet port whereby to control fluid communication between said chamber and compartment, said valve means comprising a valve member operatively associated with said outlet port and pressure responsive means defining part of said chamber operatively associated with said valve member, said valve means being adapted to move in one direction when said pump is operative to produce sub-atmospheric at said pump port whereby to open said outlet port and provide fluid communication between said chamber and compartment.

12. In combination with an air pump cyclically operable to alternately produce sub-atmospheric pressure and super-atmospheric pressure at a port of said pump, and a respirator compartment adapted for fluid communication with said port for cyclically applying sub-atmospheric pressure to said respirator compartment, a regulator device comprising a casing having a fluid chamber, an inlet port for said chamber in fluid communication with said pump port, an outlet port, for said chamber in fluid communication with said inlet and pump ports and adapted for periodic fluid communication with said compartment, and valve means for controlling the opening and closing and said outlet port whereby to control fluid communication between said chamber and compartment, said valve means comprising a valve member operatively associated with said outlet port and pressure responsive means defining part of said chamber operatively associated with said valve member, said valve means being adapted to move in one direction when said pump is operative to produce sub-atmospheric at said pump port whereby to open said outlet port and provide fluid communication between said chamber and compartment, and independent valve means for limiting the sub-atmospheric pressure applied to said compartment.

13. A vacuum regulator device comprising a casing having a vacuum chamber, an inlet port for said chamber and outlet port for said chamber in fluid communication with said inlet port, and valve means for controlling the opening and closing of said outlet port, said valve means comprising a valve member operatively associated with said outlet port, a diaphragm defining part of said chamber, and means for supporting said valve member and diaphragm in laterally spaced relation for movement in unison in response to predetermined pressure conditions in said chamber, said outlet port and said diaphragm being of different areas whereby when the vacuum in said chamber reaches a predetermined amount said movable member will be moved in one direction to concomitantly move said valve member in said direction and thereby open said outlet port, said valve member comprising a pair of companion valve discs, one of said discs being fixed to said supporting means and having an opening, the other of said discs being mounted by said supporting means for movement relative to said supporting means, said discs being movable in unison when said support means moves in said one direction to open said outlet port and the other of said discs being movable independently of said one disc in said one direction whereby to provide a passage between said discs in communication with said chamber through said opening.

14. A pressure regulator device, comprising a casing having a pressure chamber, an inlet port for said chamber, an outlet port for said chamber in fluid communication with said inlet port, and valve means for controlling the opening and closing of said outlet port, said valve means comprising a valve member operatively associated with said outlet port and pressure responsive means defining part of said chamber operatively connected with said valve member for movement in unison in response to predetermined pressure conditions in said chamber, said valve member comprising a companion pair of valve discs with one of said discs mounted in fixed relation relative to said pressure responsive means and having an opening therethrough, the other of said discs being mounted for movement relative to said pressure responsive means, said discs being movable in unison with said pressure responsive means in one direction to open said outlet port in response to predetermined negative pressure in said chamber, the other of said discs being movable independently of said one disc in said direction in response to predetermined positive pressure in said chamber whereby to provide a passage between said discs in communication with said chamber through said opening when the pressure in said chamber reaches said predetermined positive pressure.

15. A pressure regulator device, comprising a casing having a pressure chamber, an inlet port for said chamber, an outlet port for said chamber in fluid communication with said inlet port, and valve means for controlling the opening and closing of said outlet port, said valve means comprising a valve member operatively associated with said outlet port and pressure responsive means defining part of said chamber operatively connected with said valve member for movement in unison in response to predetedmined pressure conditions in said chamber, said valve member comprising a companion pair of valve discs with one of said discs mounted in fixed relation relative to said pressure responsive means and having an opening therethrough, the other of said discs being mounted for movement relative to said pressure responsive means, said discs being movable in unison with said pressure reponsive means in one direction to open said outlet port in response to predetermined negative pressure in said chamber, the other of said discs being movable independently of said one disc in said direction in response to predetermined positive pressure in said chamber whereby to provide a passage between said discs in communication with said chamber through said opening when the pressure in said chamber reaches said predetermined positive pressure, and means providing for the adjustment of the opening pressure of said valve member.

16. A vacuum regulator device comprising a casing having a vacuum chamber, an inlet port for said chamber, an outlet port for said chamber in fluid communication with said inlet port, and valve means for controlling the opening and closing of said outlet port, said valve means comprising an axially movable member extending through said vacuum chamber and having secured thereto a valve member and a flexible diaphragm in laterally spaced relation at opposite walls of said chamber, one face of said diaparagm being subjected to chamber pressure and the opposite face thereof being subjected to atmospheric pressure, said outlet port and said diaphragm being of different areas whereby when the vacuum in said chamber reaches a predetermined amount said diaphragm will be moved in one direction to concomitantly move said movable member and said valve member in said direction to open said outlet port to provide fluid communication therethrough from said chamber, said valve member comprising a pair of companion valve discs with one of said discs having an opening extending therethrough, said one disc being secured to said movable member in fixed relation therewith and the other of said discs being movably mounted on said movable member from a position of interengagement with said one disc to positions laterally spaced therefrom, means for resiliently biasing said other disc towards said one disc, said discs being movable in unison in said one direction when the vacuum in said chamber reaches said predetermined amount and said one disc being movable in a direction opposite to said one direction with said other disc being movable away from said one disc whereby to provide a passage between said discs in communication with said chamber through said opening in response to predetermined positive pressure in said chamber, means for guiding the axial movement of said movable member, and means for resiliently biasing said movable member in said opposite direction.

References Cited in the file of this patent

UNITED STATES PATENTS

| | | |
|---|---|---|
| 1,022,407 | Cramer | Apr. 9, 1912 |
| 1,518,984 | Kien | Dec. 9, 1924 |
| 1,697,865 | Hahn | Jan. 8, 1929 |
| 2,313,149 | Jacobsson | Mar. 9, 1943 |
| 2,490,395 | Wilm | Dec. 6, 1949 |
| 2,700,488 | Rafferty | Jan. 25, 1955 |